(12) United States Patent
Hurd

(10) Patent No.: US 7,720,368 B2
(45) Date of Patent: May 18, 2010

(54) SYSTEM, METHOD AND APPARATUS FOR ENHANCING A PROJECTED IMAGE

(75) Inventor: James Hurd, Flower Mound, TX (US)

(73) Assignee: Redrock Microsystems, LLC, Flower Mound, TX (US)

( * ) Notice: Subject to any disclaimer, the term of this patent is extended or adjusted under 35 U.S.C. 154(b) by 943 days.

(21) Appl. No.: 11/486,566

(22) Filed: Jul. 14, 2006

(65) Prior Publication Data

US 2007/0035705 A1 Feb. 15, 2007

Related U.S. Application Data

(60) Provisional application No. 60/699,704, filed on Jul. 15, 2005.

(51) Int. Cl.
*G03B 17/00* (2006.01)

(52) U.S. Cl. .................. 396/71; 396/150; 396/544

(58) Field of Classification Search .............. 396/71, 396/150, 544, 530; 348/335, 340
See application file for complete search history.

(56) References Cited

U.S. PATENT DOCUMENTS

| | | | |
|---|---|---|---|
| 3,610,728 A | 10/1971 | Firth | |
| 3,712,708 A | 1/1973 | Brown | |
| 4,095,257 A | 6/1978 | Back | |
| 4,264,151 A | 4/1981 | Okano | |
| 4,390,239 A | 6/1983 | Huber | |
| 4,516,171 A | 5/1985 | Yamazaki | |
| 5,471,238 A | 11/1995 | Bae | |
| 5,726,809 A | 3/1998 | Griffith | |
| 5,727,236 A | 3/1998 | Frazier | |
| 6,212,334 B1 | 4/2001 | Weigel et al. | |
| 6,523,956 B2 | 2/2003 | Oshima | |
| 6,556,354 B1 | 4/2003 | Jourjon et al. | |
| 6,616,347 B1 | 9/2003 | Dougherty | |
| 6,749,304 B2 | 6/2004 | Jacumet | |
| 7,092,025 B2 | 8/2006 | Gabel et al. | |
| 2005/0041133 A1 | 2/2005 | Weigel | |
| 2006/0170808 A1* | 8/2006 | Biernath et al. | ............. 348/335 |

\* cited by examiner

*Primary Examiner*—Christopher Mahoney
(74) *Attorney, Agent, or Firm*—Daniel J. Chalker; Edwin S. Flores; Chalker Flores, LLP

(57) ABSTRACT

The present invention provides a system, method and apparatus for enhancing a projected image to reduce the optical depth of field, and create a more desirable film-like image. The present invention provides a multi-function imaging element for enhancing a projected image that includes a focusing screen that minimizes light hot spots in an image projected on the focusing screen and filters ultraviolet rays. The focusing screen can be static, moving, oscillating or rotating. The ultraviolet rays are filtered using a coating on the focusing screen, or by a separate filter made of glass, plastic or film. Note that the multi-function imaging element can be integrated into an adapter, a camera, a video camera, a projector, a television, a monitor, or other image capture or display device.

27 Claims, 6 Drawing Sheets

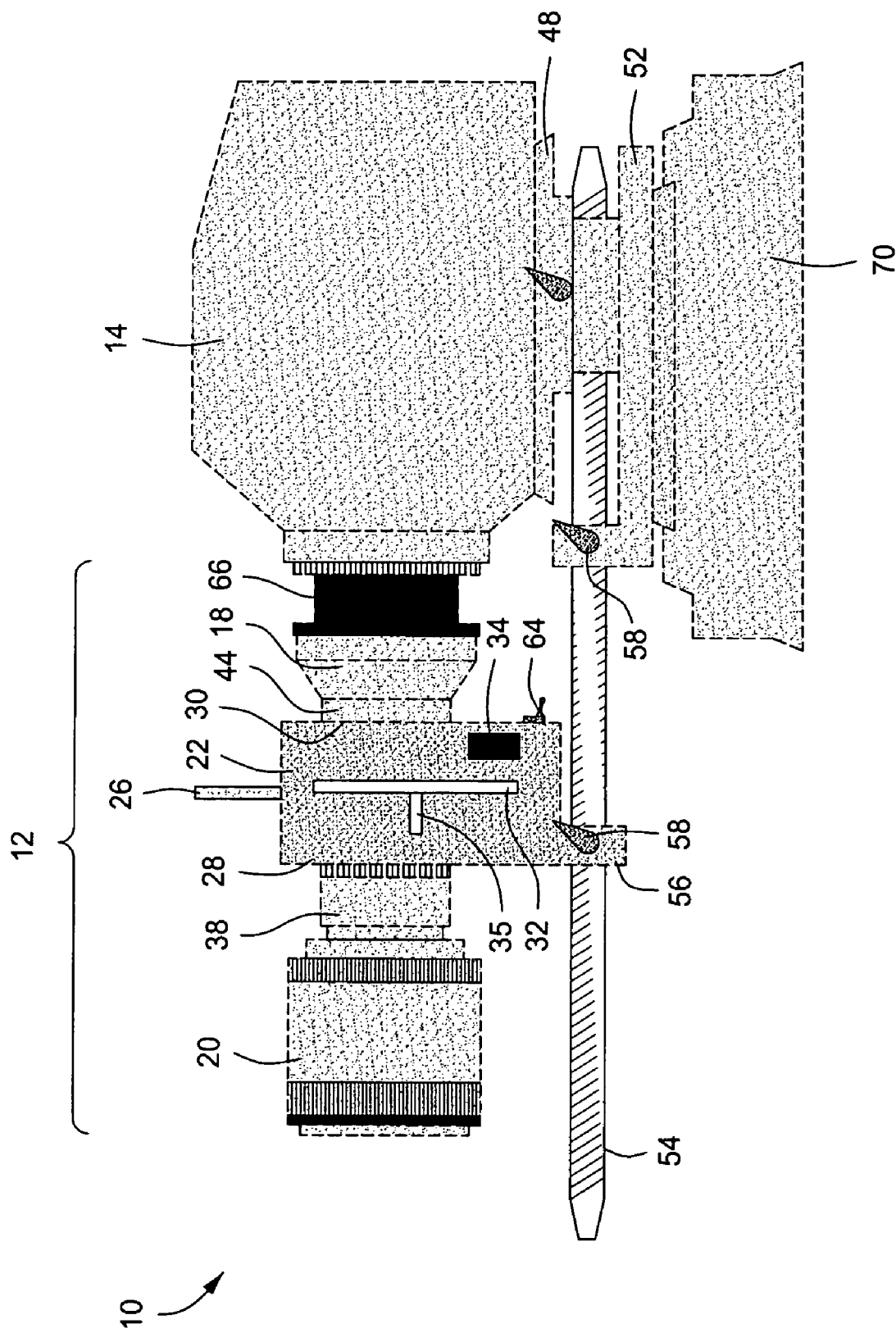

SYSTEM, METHOD AND APPARATUS FOR ENHANCING A PROJECTED IMAGE

PRIORITY CLAIM

This patent application is a non-provisional application of U.S. provisional patent application 60/699,704 filed on Jul. 15, 2005 and entitled "A Multi-Function Element to Improve Video Adapters," which is hereby incorporated by reference in its entirety.

TECHNICAL FIELD OF THE INVENTION

The present invention relates in general to the field of image projection and adapters and more specifically to a system, method and apparatus for enhancing a projected image to reduce the optical depth of field, and create a more desirable film-like image.

BACKGROUND OF THE INVENTION

Without limiting the scope of the invention, its background is described in connection with video camera units and video adapters. Although, video adapters for generic video cameras have been in use for years in an attempt to enhance the quality of the recorded image and reduce the optical depth of field to create a more desirable film-like image, they are typically complex, expensive and do not provide cinematic quality depth of field control. The inability to use interchangeable 35 mm lenses has left the depth-of-field (DOF) problem elusive or too expensive to achieve. The image sensors in most video cameras are too small to provide cinematic depth of field control. It is very difficult to get an object in sharp focus in the foreground against a blurred background, to communicate depth with focus, and to provide cinematic rack focus for shifting attention in a scene with most video cameras.

More specifically, conventional video camera adapters are expensive and require many individual components to achieve the desired effect. Moreover, each component adds cost and must be carefully selected and matched to meet the requirements of the overall system. In addition, these conventional multi-function imaging elements negatively affect image quality. For example, a separate DCX or Fresnel lens glued to the focusing screen; however, this approach degrades the image by reducing overall resolution and contrast of the projected image. Also, another problem is long-term loss of optical quality as many adapters do not incorporate a UV filter and suffer from degrading image quality over time due to damage from UV light.

For example, U.S. patent application Ser. No. 10/469,295 entitled "Video Camera and Adapter for said Video Camera" discloses a video camera. The adapter has a camera housing with a first objective, through which light from a scene to be picked up is guidable into the camera housing. A semiconductor sensor field, on which light from the scene to be picked up is able to be cumulated. The device further includes a projection area disposed with respect to the first objective such that light introduced through the first objective is imaged onto the projection area. A second objective disposed with respect to the projection area and to the semiconductor sensor field such that light from the projection area is imaged onto the semiconductor sensor field.

Similarly, U.S. patent application Ser. No. 10/877,371 entitled "Video-Camera Unit and Adapter for a Video-Camera Unit" discloses an adapter for a video camera. The adapter has a connection for a camera lens, a connection for a video camera, and an image transfer unit disposed between these two connections. The image transfer unit has a photoreceptive surface and wherein the image transfer unit further includes a beam splitter for branching off an optical viewfinder path. An optical deflection element can be moved into and out of the optical viewfinder path so that the optical viewfinder image or the image of a monitor can be seen by a user.

While these devices may be suitable for the particular purpose to which they address, they are less desirable for creating the look of 35 mm film with a more shallow focus using a video camera unit.

SUMMARY OF THE INVENTION

The present invention provides a system, method and apparatus for enhancing a projected image to reduce the optical depth of field, and create a more desirable film-like image. In addition, the present invention allows the use of interchangeable 35 mm lenses to allow filmmakers the freedom to achieve varying angles of view, focus, and a shallow depth of field that are commonly used in cinematic techniques where the objects the filmmaker wants to highlight is in focus, where everything else is blurred. More specifically, the present invention provides a multi-function imaging element for enhancing a projected image that includes a focusing screen that minimizes light hot spots in an image projected on the focusing screen and filters ultraviolet rays. The focusing screen can be a diffusion screen made of glass, ground glass, acrylic, crystalline wax or plastic that has been treated by sandblasting, laser etching or acid washing. Moreover, the focusing screen can be static, moving, oscillating or rotating. The ultraviolet rays are filtered using a coating on the focusing screen, or by a separate filter made of glass, plastic or film. Note that the multi-function imaging element can be integrated into an adapter, a camera, a video camera, a projector, a television, a monitor, or other image capture or display device.

Moreover, the present invention provides a method for providing an enhanced image by filtering light to reduce ultraviolet rays, diffusing the filtered light to minimize light hot spots, and projecting the diffused light on an image reception area to create the enhanced image.

The present invention also provides an adapter that includes a housing, a focusing screen, a lens mount, a hood and an achromatic lens. The housing has a first aperture positioned in optical communication with a second aperture. The focusing screen is disposed within the housing between the first aperture and the second aperture. The lens mount is connected to the housing and fitted around the first aperture. The hood is connected to the housing and fitted around the second aperture. The achromatic lens is connected to the hood and in optical communication with the second aperture.

In addition, the present invention provides an adapter kit that includes a focusing screen, a housing, a lens mount, a hood and an achromatic lens. The housing has a first aperture positioned in optical communication with a second aperture to enclose the focusing screen between the first aperture and the second aperture. The lens mount is suitable for connecting to the housing and fitting around the first aperture. The hood is suitable for connecting to the housing and fitting around the second aperture. The achromatic lens is suitable for connecting to the hood in optical communication with the second aperture.

Moreover, the present invention provides a system that includes an image capture or display device, a lens and a focusing screen disposed between the video camera and the lens that minimizes light hot spots in an image projected on the focusing screen and filters ultraviolet rays. The focusing screen can be disposed within an adapter and a mount can be connected to the image capture or display device, the lens and the adapter to stabilize the system.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

For a more complete understanding of the features and advantages of the present invention, reference is now made to the detailed description of the invention along with the accompanying figures and in which:

FIG. 7 is a side view of one embodiment of the present invention.

DETAILED DESCRIPTION OF THE INVENTION

Figure 1:
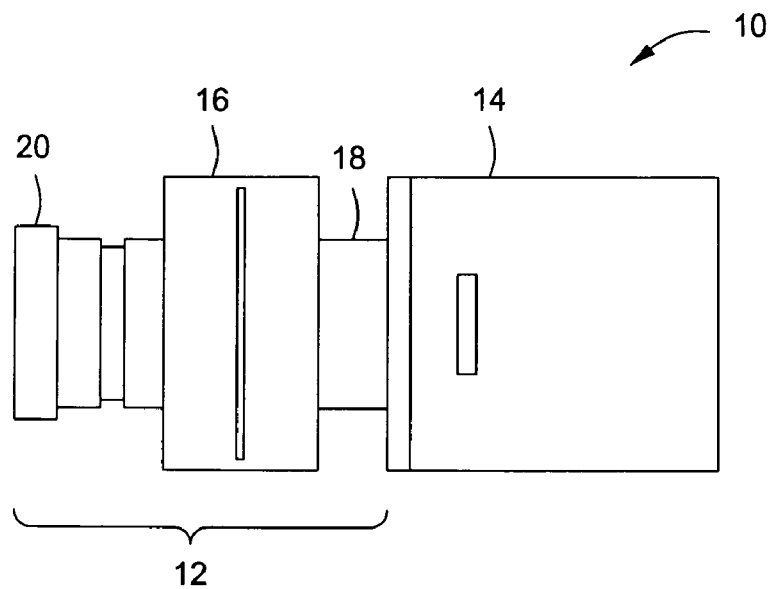
FIG. 1, is a side view of one embodiment of the present invention that illustrates a 35 mm camera lens adapter for a video camera system.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Although it is possible to create the right combination of lenses and adapters so that the light from a 35 mm lens could be focused directly onto the camera sensor, it does not create the desired effect: the 35 mm look. Depth of focus is related to image size. If the final image is $\frac{1}{3}^{rd}$ of an inch (about 16 mm) then there will be a very deep focus. Getting an object in focus in the foreground against an out-of-focus background might require that the background be 50 feet or more behind the foreground. This deep focus is one characteristic of digital video. The goal is not just to shoot video through a 35 mm lens, but to get the look of 35 mm film, including a more shallow focus. If the final image is closer to 35 mm (e.g., about $\frac{2}{3}^{rds}$ of an inch), then there will be a shallower depth of focus. A background might only need to be a few feet behind the foreground to be out-of-focus. The lens adapter of the present invention creates an image on the screen disc that is close to 35 mm in size and displays a depth of focus similar to 35 mm film.

The present invention provides a system, method and apparatus for enhancing a projected image to reduce the optical depth of field, and create a more desirable film-like image. In addition, the present invention allows the use of interchangeable 35 mm lenses to allow filmmakers the freedom to achieve varying angles of view, focus, and a shallow depth of field that are commonly used in cinematic techniques where the objects the filmmaker wants to highlight is in focus, where everything else is blurred. More specifically, the present invention provides a multi-function imaging element for enhancing a projected image that includes a focusing screen that minimizes light hot spots in an image projected on the focusing screen and filters ultraviolet rays. The focusing screen can be a diffusion screen made of glass, ground glass, acrylic, crystalline wax or plastic that has been treated by sandblasting, laser etching or acid washing. Moreover, the focusing screen can be static, moving, oscillating or rotating. The ultraviolet rays are filtered using a coating on the focusing screen, or by a separate filter made of glass, plastic or film. Note that the multi-function imaging element can be integrated into an adapter, a camera, a video camera, a projector, a television, a monitor, or other image capture or display device.

Moreover, the present invention provides a method for providing an enhanced image by filtering light to reduce ultraviolet rays, diffusing the filtered light to minimize light hot spots, and projecting the diffused light on an image reception area to create the enhanced image.

The present invention also provides an adapter that includes a housing, a focusing screen, a lens mount, a hood and an achromatic lens. The housing has a first aperture positioned in optical communication with a second aperture. The focusing screen is disposed within the housing between the first aperture and the second aperture. The lens mount is connected to the housing and fitted around the first aperture. The hood is connected to the housing and fitted around the second aperture. The achromatic lens is connected to the hood and in optical communication with the second aperture.

In addition, the present invention provides an adapter kit that includes a focusing screen, a housing, a lens mount, a hood and an achromatic lens. The housing has a first aperture positioned in optical communication with a second aperture to enclose the focusing screen between the first aperture and the second aperture. The lens mount is suitable for connecting to the housing and fitting around the first aperture. The hood is suitable for connecting to the housing and fitting around the second aperture. The achromatic lens is suitable for connecting to the hood in optical communication with the second aperture.

Moreover, the present invention provides a system that includes an image capture or display device, a lens and a focusing screen disposed between the video camera and the lens that minimizes light hot spots in an image projected on the focusing screen and filters ultraviolet rays. The focusing screen can be disposed within an adapter and a mount can be connected to the image capture or display device, the lens and the adapter to stabilize the system.

Generally, the resulting reaction of transferring an image to a film results in a grain or texture. The size and shape of grain depends on the chemical process that occurs and as such the grain from one frame to another is different. There are two kinds of 35 mm lens adapters for video cameras, those with static screens and those with moving screens. The lens adapter 10 of the present invention uses a moving screen. The imperfections in the surface of a static screen can simulate the appearance of grain; however, these imperfections are unchanging from one frame to another and can be distracting and for an unrealistic image. Therefore, with a static screen, the challenge is to make the imperfections so small that they are not noticeable i.e., smaller than film grain. The lens adapter of the present invention uses ground glass that has been manufactured so that the imperfections are similar in size to film grain. When the screen disc moves, oscillates or rotates inside the housing, the grain pattern appears to be changing from one frame to another, like in film and results is a look that is similar to 35 mm film.

The present invention provides an adapter that provides an intermediate image to be projected on to a screen disc for subsequent transfer to an image capture or display device, such as a camera, a video camera, a projector, a television or a monitor. The present invention includes elements to reduce "hot spots" in the intermediate image and to shield the video camera adapter from harmful UV rays to preserve device longevity and optical quality. The present invention enables an intermediate image to be projected for subsequent transfer to the image capture or display device. The screen disc is positioned with respect to the initial camera lens such that light guided through this first lens is imaged onto the screen disc. The screen disc can be static, moving, oscillating or rotating. The following description relates to the use of the present invention with a video camera as an example without limiting the scope of the invention.

Now referring to FIG. 1, a side view of one embodiment of the present invention that illustrates a video camera system that includes a 35 mm lens adapter is shown. The video camera system 10 includes a lens adapter 12 in communication with a video camera 14. The lens adapter 12 includes a housing 16 that is connected to the video camera 14 via a hub adaptor 18. The housing 16 is fitted for attachment of a camera lens 20 (e.g., an optical 35 mm lens) for optical communication with the video camera 14.

Figure 2:
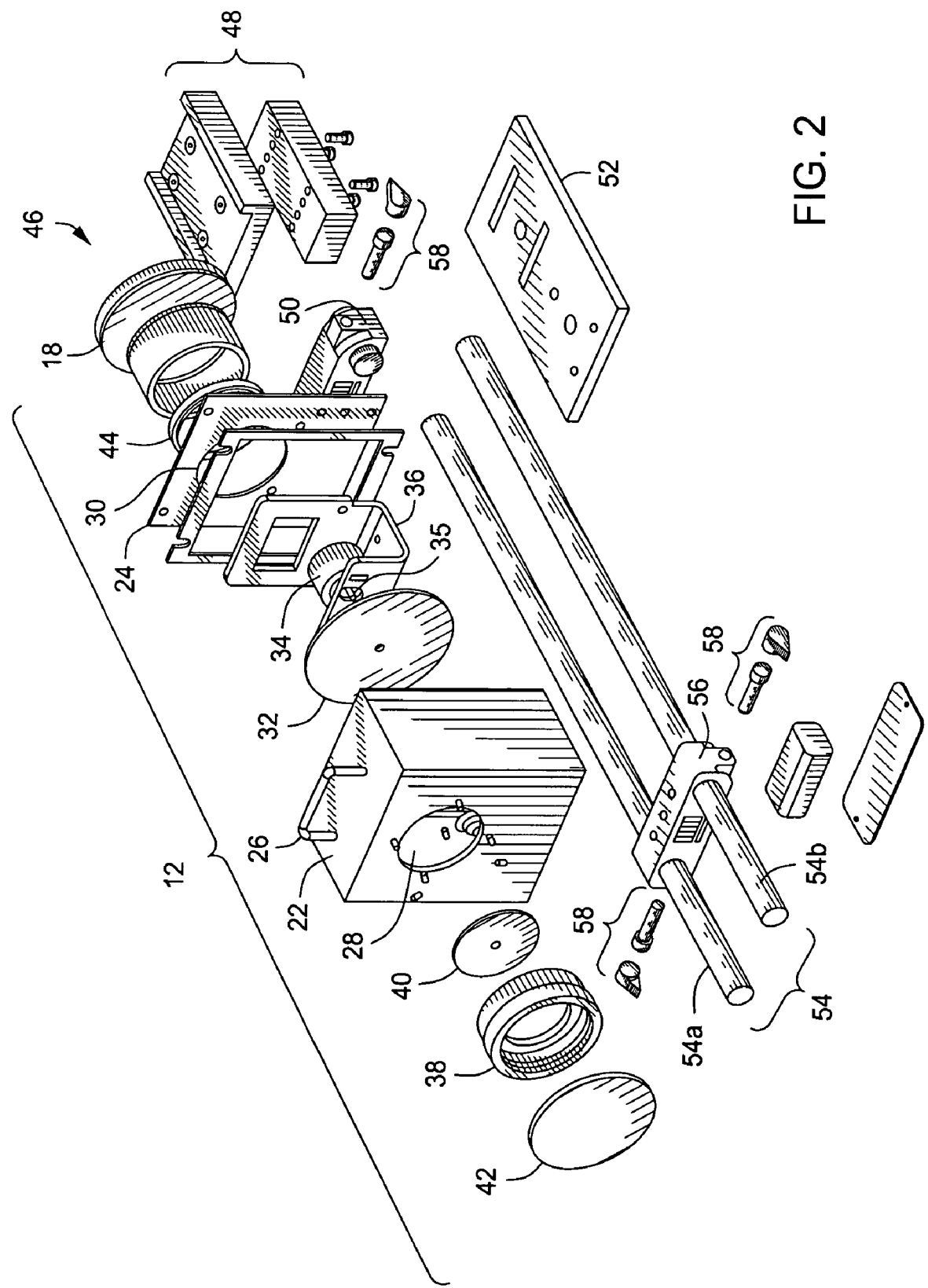
FIG. 2, is an exploded view of one embodiment of the present invention that illustrates a lens adapter for a video camera.

FIG. 2, an exploded view of one embodiment of the present invention that illustrates a lens adapter for a video camera. The lens adapter 12 includes a first housing portion 22 designed to mate to a second housing portion 24 to form a housing 16. Some embodiments may include a handle 26 attached to the housing 16. The first housing portion 22 includes a first aperture 28 positioned in optical communication with a second aperture 30 positioned in the second housing portion 24. A screen disc 32 is in operable communication with a motor 34 secured to a motor mount 36 and positioned between the first aperture 28 and the second aperture 30 and. The motor 34 is in communication with a power supply (not shown) and optionally an on/off mechanism (not shown) to engage the screen disc 32. The first aperture 28 fits a first coupling adaptor 38 to connect the housing 16 to a camera lens (not shown). The first coupling adaptor 38 may include one or more filters 40 and 42, e.g., UV filters, infrared (IR) pass filters, polarizing filters, circular polarizer filters, sky filters, moose filters, linear polarizer filters, linear focus filters, neutral density filters, special effects filters, cross screen filters, soft screen filters, star 6 filters, star 8 filters, close-up filters, split field filters, special effect filters, multivision filters, mirage filters, misty spot filters, breeze filters, halo filters, windmill filters, gradual filters, center spot filters, soft spot filters, softener filters, intensifier filters, portrait, duto filters, diffusion filters, spot filters, fog a filters, fog b filters, colored filters, half colored filters, gradual color filters, fluorescent filters, warming filters, cooling filters, and other filters known to the skilled artisan.

The first coupling adaptor 38 is adapted to fit the first aperture 28 and connected to one/or more reducer conduits (not shown) and/or DCX lens mounts (not shown). For example, a DCX lens 40 may be positioned about the DCX lens mount and a second DCX lens mount may be connected to the first DCX lens and thereby allow a 35 mm camera lens 20 to be attached to the second DCX lens mount for focusing of the image. Generally, a DCX lens is used to spread the light evenly on the ground glass screen disc 24 and reduce any hot spots that can occur.

The second housing portion 24 includes a second coupling adaptor 44 positioned about the second aperture 30 and attached to a hub adaptor 18. In addition, a camera mounting plate 48 and housing mounting plate 50 may be connected to a support plate 52 and support rods 54a and 54b. The housing 16 may also be attached to the support rods 54 via a support bracket 56. The housing mounting plate 50 and support bracket 56 may be connected using quick release fasteners 58; however, alternative methods of attachment may be used including screws, bolts, clips, fasteners welds, epoxy, glue, as well as incorporation using an unibody design, a cast design, a molded design, a machining design or other mechanism known to the skilled artisan.

A camera lens 20 (e.g., a 35 mm lens) is used to focus the image on the screen disc 32. An achromatic lens (not shown) is positioned between the screen disc 32 and the video camera 14. The achromatic lens (not shown) functions as a magnifying lens and enables a video camera 14 to focus only a few inches away on the image on the screen disc 32 to record the 35 mm image that is projected thereon. Light from the scene passes through the camera lens 20 into the housing 16 of the lens adapter 12, where it creates an image on the screen disc 32. The rotation of the screen disc 32 eliminates the appearance of the screen disc grain and provides a beautifully clear image. The camera lens 20, the achromatic lens (not shown) and the screen disc 24 together work very much like a camera obscura or like a view camera.

The screen disc 32 may be made from various materials but not limited to glass, plastic, polymers, acrylic or other material known to the skilled artisan. The material may undergo various treatments including sand blasting, laser etching, acid washing, or other treatments designed to create or enhance a projection screen for receiving the light from the initial camera lens. In addition, the present invention further includes combination and various ordering of elements, such as fresnel screens (not shown), DCX filters (not shown), light-enhancing optical filters (not shown) and screen disc 32 of glass, acrylic, crystalline wax, or plastics. The present invention includes a lens adapter 12 having a screen disc 32 that is positioned about the center of the housing 16. The screen disc 32 is a specially designed image screen mounted on a spindle 35 that rotates at high speeds, while the image is being displayed on the screen disc 32. In addition, the screen disc 32 need not be a disk at all and may have any convenient shape. The screen disc 32 of the present invention may be manufactured so that the imperfections are larger or smaller than film grain. A stationary, moving or oscillating screen disc 32 may also be used.

The present invention may be made by forming a first aperture 28 in a first housing portion 22 that aligns with a corresponding second aperture 30 formed in the second housing portion 24, e.g., the aperture 28 may be about 3 inches from the bottom edge and about 1.8 inches from the long edge. The first coupling adaptor 38 is adapted to fit the first aperture 28 and the second coupling adaptor 44 is adapted to fit the first aperture 30. In one embodiment, the first coupling adaptor 38 mates to a fitting (not shown) positioned on the inside of the first housing portion 22. One or more reducer conduits (not shown) and/or DCX lens mounts (not shown) are connected to the first coupling adaptor 38. Similarly, a second coupling adapter 44 is adapted to engage the second housing portion 24 of the housing 14. A hub adaptor 18 is connected to the second coupling adaptor 44 so that it is in optical communication with the video camera 14.

Optionally, a power switch aperture (not shown) and handle apertures (not shown) may be formed in the housing 14 for fitment of the power switch (not shown) and handle 16. The power source (not shown) may be positioned within the housing 14 and in electrical communication with a motor 34. The power source (not shown) may be a battery or an external power supply. The screen disc 32 is attached operably to a spindle 35 and to the motor shaft (not shown) of the motor 34.

Figure 3:
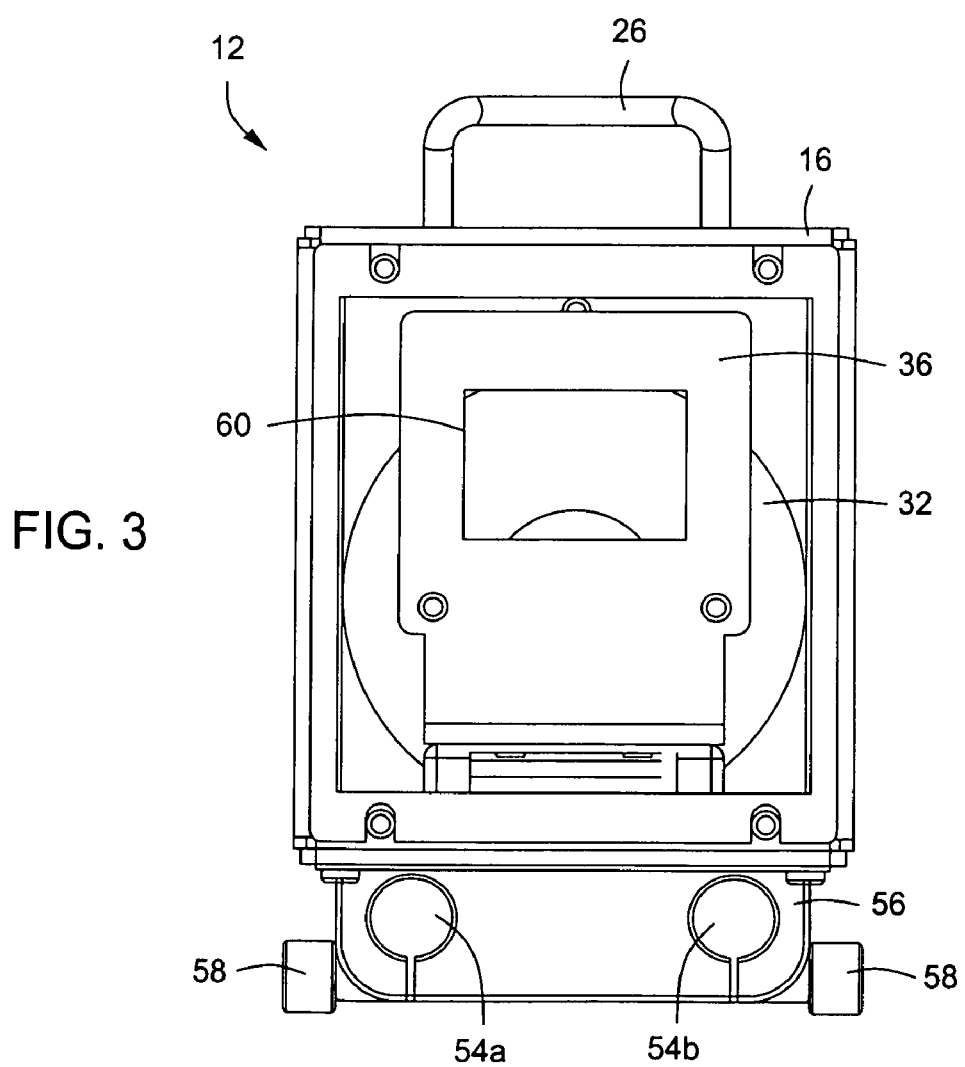
FIG. 3, is a cross sectional view of one embodiment of the present invention.

Referring now to FIG. 3, a cross sectional view of one embodiment of the present invention illustrating a lens adapter for video cameras is shown. FIG. 3 illustrates the alignment down the viewing axis from the scene through the camera lens 20 and first coupling adaptor 38, to the screen disc 32 and focal point aperture 60, through the second coupling adaptor 44 and into the video camera 14. The lens adapter 12 includes a housing 16 with a motor (not shown) positioned about the housing 16 by a motor mount 36. The motor mount 36 includes a focal point aperture 60 positioned to align the video camera 14 and the camera lens 20. A screen disc 32 is attached to the motor (not shown) and visible through the focal point aperture 60. This embodiment of the lens adapter 12 includes a handle 26 and a support bracket 56 attached to the housing 16. The support bracket 56 receives the support rods 54a and 54b and includes the quick release fasteners 58.

Figure 4:
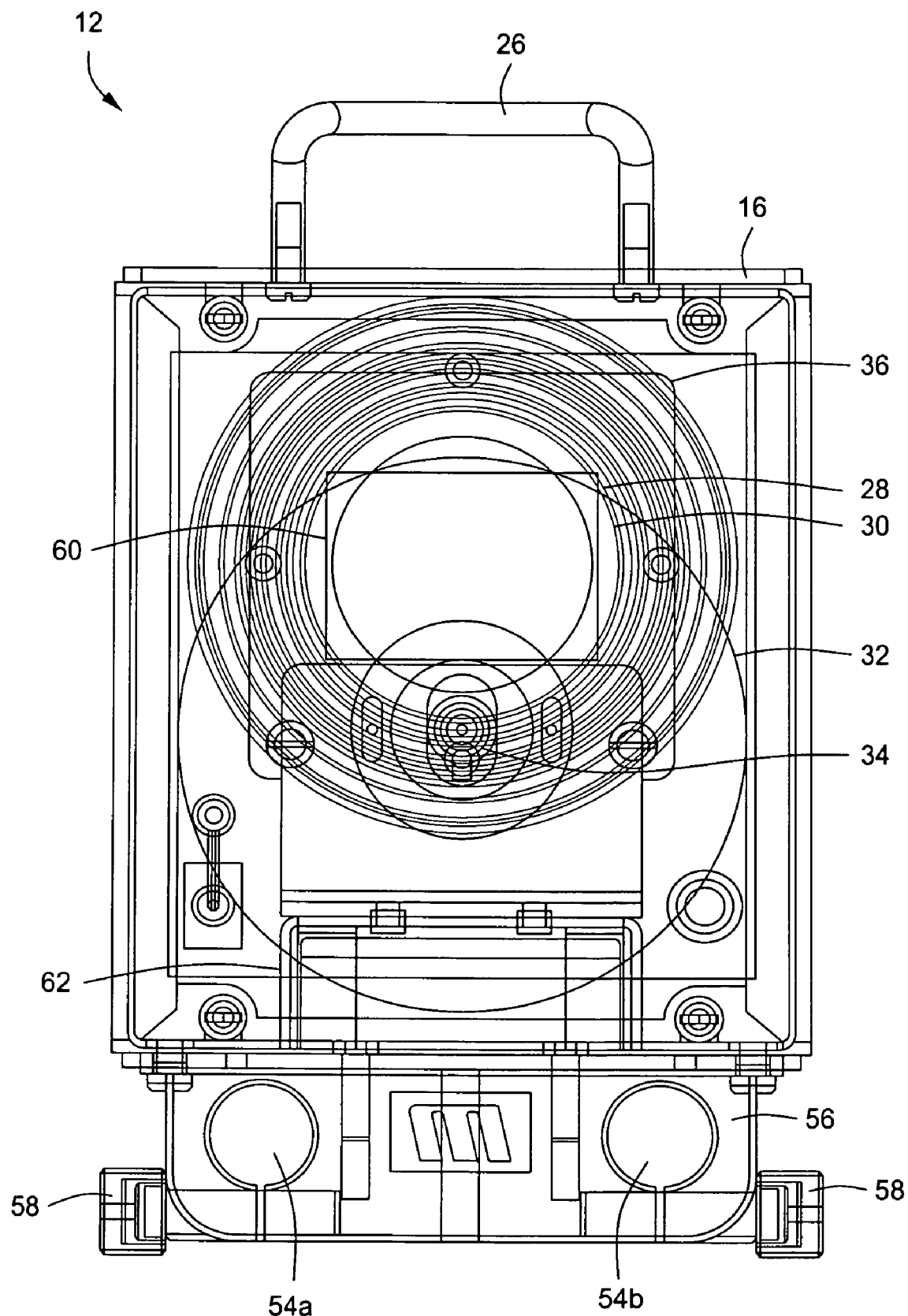
FIG. 4, a transparent view of one embodiment of the present.

Referring now to FIG. 4, a transparent view of one embodiment of the present invention illustrating a lens adapter for video cameras is shown. The lens adapter 12 includes a housing 16 with a motor 34 positioned about the housing 22 by a motor mount 36. A screen disc 32 is attached to the motor 34 via the motor mount 36 that includes a focal point aperture 60. A power source 62 is also positioned in the housing 16 and in electrical communication with the motor 34. This embodiment of the lens adapter 12 includes a handle 26 and a support bracket 56 attached to the housing 16. The support bracket 56 receives the support rods 54a and 54b and includes the quick release fasteners 58. In addition, FIG. 4 also illustrates the alignment of the first aperture 28, second aperture 30, screen disc 32 and focal point aperture 60.

Figure 5:
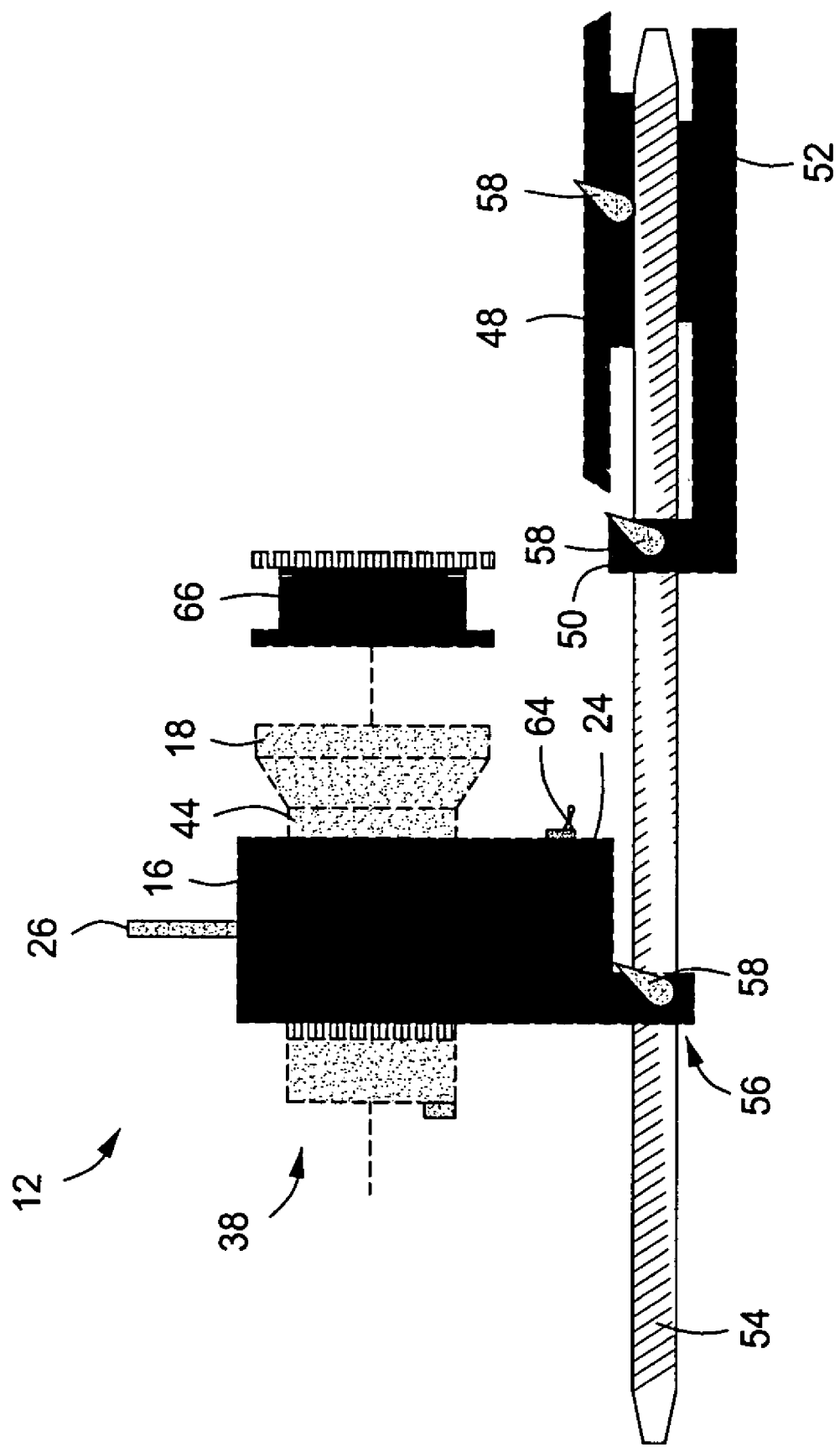
FIG. 5 is a side view of one embodiment of the present invention.

FIG. 5 illustrates a side view of one embodiment of the present invention. The lens adapter 12 includes a housing 16 having a first aperture (not shown) positioned in optical communication with a second aperture (not shown). In addition, the housing 16 includes an on/off switch 64 and a handle 26. A power source (not shown) is in electrical communication with a motor (not shown) positioned within the housing 16. A first adaptor 38 is connected to the housing 16 at the first aperture 28 and to the camera lens (not shown). A second coupling adaptor 44 is positioned about the second aperture 30 to connect the housing to the hub adaptor 18. The hub adaptor 18 in-turn connects the achromatic lens 66, to the video camera (not shown) to focus on the screen disc (not shown) and record the image on the screen disc (not shown). In addition, a camera mounting plate 48 may be connected to the housing mounting plate 50 and the support rod 54. The support plate 52 and support bracket 56 may be connected using quick release fasteners 58. The support bracket 56 may be a part of the housing 14. The support rod 54 may be attached through or to the camera mounting plate 48.

Figure 6:
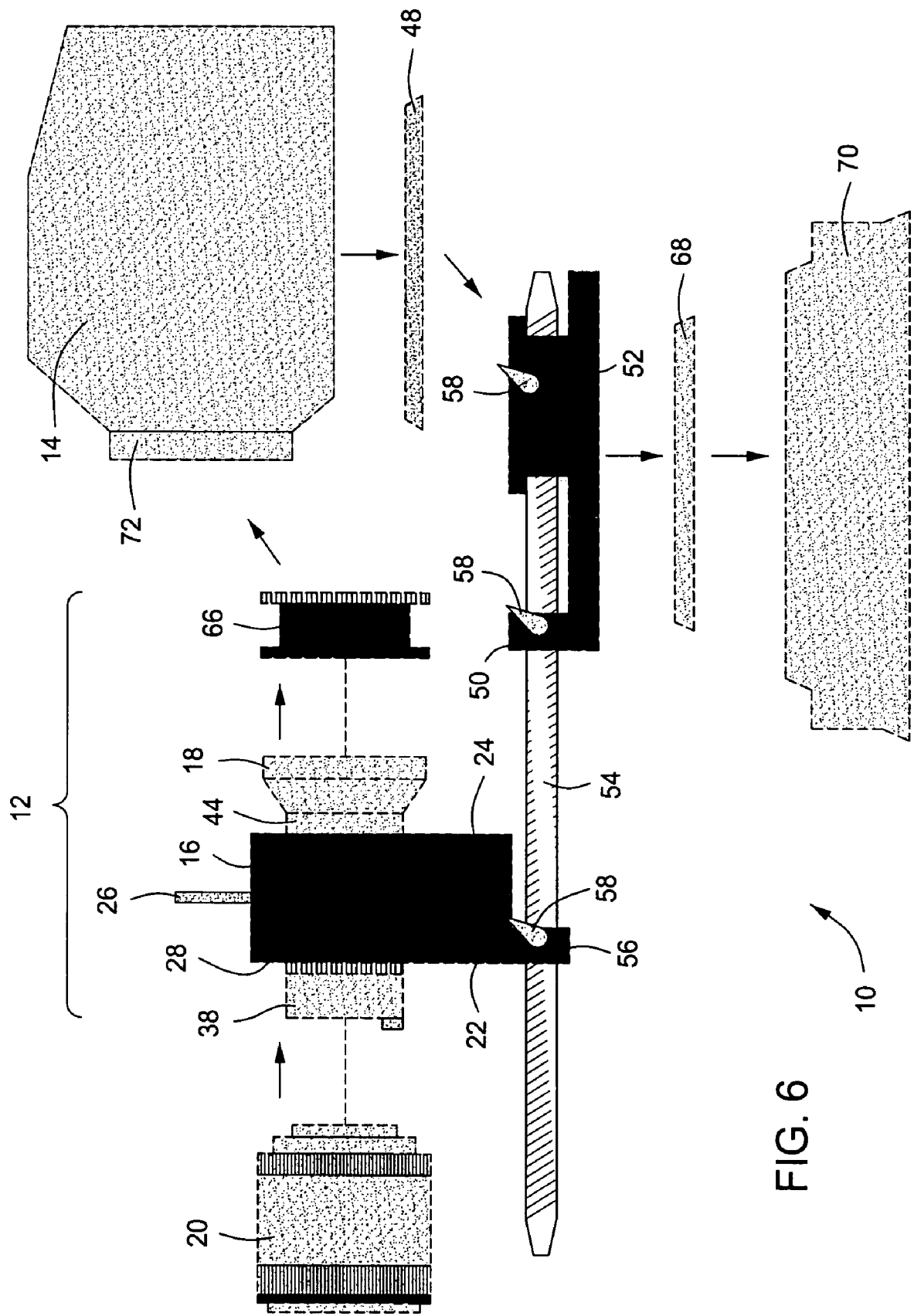
FIG. 6 is an exploded side view of one embodiment of the present invention is illustrated.

Now referring to FIG. 6, an exploded side view of one embodiment of the present invention is illustrated. The video camera system 10 includes a lens adapter 12 in communication with a video camera 14 and camera lens 20. The lens adapter 12 includes a handle 26 disposed on a housing 16 having a first housing portion 22 with a first aperture 28 and second housing portion 24 second aperture 30. The camera lens 20 is aligned in optical communication with the first housing portion 22 and the first aperture 28 as well as the second coupling adaptor 44 and the hub adaptor 18. The hub adaptor 18 is in optical communication with an achromatic lens 66 and the video camera 14.

In addition, a camera mounting plate 48 may be connected to the video camera 14 and to support plate 52 and in turn to the support rod 54. A support bracket 56 may be attached to the housing 16 using screw (not shown) or other fasteners. The support rod 54 may be attached through or to the camera mounting plate 48 and the support bracket 56. Similarly, the video camera 14 may be attached to the camera mounting plate 48. The video camera system 10 may be connected to a mount 68 and secured to a tripod or other system 70. To allow alternative configurations the camera support 52 may include a rod support clamp (not shown) to allow movement about the support rod 54 and a quick release fasteners 58 to allow the video camera 14 to be removed from the video camera system 10.

The lens adapter 12 of the present invention can include various configurations, e.g., a wide selection of 35 mm lens mounts and types. The first coupling adaptor 38 enable existing SLR camera lenses to be repurposed from various manufacturers or use professional cinema (motion picture) lenses. Therefore, the lens adapter 12 may use zoom lenses, fish eye lenses, wide angle lenses, or any size lens desired for the specific application. For example, a fast (e.g., f12.8 or lower) SLR lens may be uses, but a high quality image can be achieved with the lens adapter 12 using almost any camera lens (not shown). The camera lens should have manual aperture control. The table below lists the first coupling adaptor 38 available and describes the kinds of lenses that are supported.

| Lens Mount | Lenses Supported |
| --- | --- |
| Canon EOS lens mount | Canon EOS (EF) Lenses |
| Canon FD/FL lens mount | Canon FD Lenses |
| | Canon FL Lenses |
| | The following lenses require a camera body to adjust the aperture and are not recommended for this application even though they can be attached: |
| | Canon EF (EOS) lenses |
| | Canon FD lenses without FL mode |
| Nikon F lens mount | All Nikon F-mount lenses (Tamron, Sigma, and others) |
| Pentax K lens mount | Pentax K lenses |
| Pentax Screw lens mount | Pentax Screw Mount Lenses (uses Pentax K to screw mount converter |
| Minolta MD lens mount | Minolta MD lenses |
| Olympus lens mount | Olympus lenses |
| PL lens mount | Zeiss, Cooke, or Arri (professional cinema and motion picture lenses) |
| OCT 19 lens mount | Motion picture lenses from Russia (Konvas 35 mm camera lenses) |

The present invention is capable of focusing on objects a few inches away with or without a macro and includes a high quality achromatic lens 66, which assists the video camera 14 with the close-up focus. For video cameras 14 with a longer minimum focus distance (e.g., Sony Z1, FX1, Sony PD150 and PD170 and the DVX100 non-A) a spacer tube (not shown) may be used to adapt the lens adapter 12 to the video camera 14. The skilled artisan will recognize that many step-up rings (not shown) and step-down rings (not shown) are available to adjust the camera lens 20 to 72 mm so that other sized lenses may be used and that optional shims may be used for vertical spacing to reach about 50 mm.

FIG. 7 is a side view of one embodiment of the present invention. The video camera system 10 includes a lens adapter 12 in communication with a video camera 14 and camera lens 20. The lens adapter 12 includes a housing 16 positioned between a first coupling adaptor 38 and a second coupling adaptor 44. The housing 16 encloses a screen disc 32 attached to a spindle 35 that is in operable communication with a motor 34 that is secured to a motor mount (not shown) positioned between the first aperture 28 and the second aperture 30. The handle 26 positioned on housing 16 provides a pickup point.

The first aperture 28 connects the camera lens 20 to the housing 16 and aligns with the second aperture 30. The second aperture 30 connects the housing 16 and the second coupling adaptor 44 to the achromatic lens 66 and the video camera 14 to enabling the video camera 14 to focus on the screen disc 32 and record the 35 mm image that is projected onto the screen disc 32. The camera lens 20 is aligned in optical communication with the video camera 14 through the housing 12.

In addition, a camera mounting plate 48 may be connected to the video camera 14, the support plate 52, the support rods 54, the housing mounting plate 50 and the support bracket 56. The support bracket 56 may be connected using quick release fasteners 58 screw (not shown) or other fasteners (not shown) or may be an integral part of the housing 14. The support rod 54 may be attached through or to the support plate 52 and the support bracket 56. The support rod 54 may be attached through or to a support bracket 56 and into a support plate 52. The video camera system 10 may be connected to a mount 68 and secured to a tripod or other system 70. To allow alternative configurations the rod support clamps (not shown) may be used to provide movement about the support rod 54.

The present invention includes a lens adapter 12 having a power source (not shown) in electrical communication with a motor (not shown) positioned about the housing 16 by a motor mount (not shown). A screen disc (not shown) is attached to the motor 22. The housing 16 includes a first housing portion 22 mated to a second housing portion 24 with corresponding first and second apertures 28 and 30. The first aperture 28 includes a first coupling adapter 38 in optical communication with a second coupling adapter 44 and a hub adaptor 18. The second coupling adapter 44 may be fitted to the achromatic lens 66. The housing 12 includes a first aperture 28 aligned with the first coupling aperture 38 in the first housing portion 22 and is in optical communication with the second aperture 30, a second coupling adapter 44, male hub adaptor 18 and the achromatic lens 66. The achromatic lens 66 and the video camera 14 are also in optical communication.

The present invention is capable of focusing on objects a few inches away with or without a macro and includes a high quality achromatic lens 66, which assists the video camera 14 with the close-up focus. For video cameras 14 with a longer minimum focus distance (e.g., Sony Z1, FX1, Sony PD150 and PD170 and the DVX100 non-A) a spacer tube (not shown) may be used to adapt the lens adapter 12 to the video camera 14. The skilled artisan will recognize that many step-up rings (not shown) and step-down rings (not shown) are available to adjust the camera lens 20 to 72 mm so that other sized lenses may be used and that optional shims may be used for vertical spacing to reach about 50 mm.

The present invention provides for the use of numerous camera lenses 20, e.g., 35 mm lenses and 35 mm SLR camera lenses as mounts are available for Canon MF, Canon AF, Nikon, PL, and OCT-19, and Pentax. The present invention allows the use of interchangeable mounts to change lenses, e.g., Nikon, Canon, Cooke or Arri Ultra Primes. For example, the master shots may use a 20 mm wide angle lens; a 50 mm for the standard scenes; and an 85 mm for that shallow depth-of-field close-up.

Similarly, the present invention provides a lens adaptor 12 that may be used with most modern DV and HD/V camera available, e.g., Panasonic AG-DVX100 and AG-DVX100A, and AG-DVX100B; Canon XL1, Canon XL1S, XL2; Sony Z1U and FX1; JVC HD100; Panasonic DCX30; Panasonic HVX-200; Sony PD150, 170; Sony PC9; and Canon XL-H1). Additionally, the present invention will work with any camera that meet or exceed the general technical requirements defined herein.

For example, the lens adapter 12 of the present invention may be used with a professional cinematic video camera, e.g., those produced by Panasonic, Canon, JVC and Sony. Cinematic video cameras are usually 3-chip (3-CCD) cameras and have more features than smaller consumer video cameras, e.g., manual control over the focus and iris. The lens adapter 12 of the present invention is designed for use with a 72 mm lens that is common on many of the professional cinematic video cameras (not shown). Some video cameras (not shown) with larger or smaller lenses will require adapter rings (not shown) or spacers (not shown) to attach the camera (not shown) to the lens adapter 10, and may require one or more shims (not shown) to raise the video camera 14 so that the lens center is 50 mm above the camera mounting plate 48. The video camera 14 generally includes a standard ⅜" or ¼" screw mount to mount the video camera 14 to the camera mounting plate 48. The table below describes common video cameras 14 that have been used with the lens adapter 12 of the present invention and additional equipment suggested.

| Video Camera | Adapters Recommended | SD Achromat | HD Achromat |
|---|---|---|---|
| Canon XL1 | None | X | |
| Canon XL1s | None | X | |
| Canon XL2 | None | X | |
| Canon XLH1 | Shim kit | | X |
| Canon GL2 | Shim kit | X | |
| JVC GY-HD100, HD200, HD250 | Shim kit 82 mm to 72 mm step-down ring | | X |
| Panasonic AG-DVX100 | 1" Spacer Tube | X | |
| Panasonic AG-DVX100A/100B | None | X | |
| Panasonic DCX30 | None | X | |
| Panasonic HVX200 | Shim kit 82 mm to 72 mm step-down ring | | X |
| Sony FX1 | None | | X |
| Sony PC9 | Shim kit | X | |
| Sony PD150 | 1" Spacer Tube | X | |
| Sony PD170 | 1" Spacer Tube | X | |
| Sony Z1U | None | | X |
| Sony HC/A1 | Shim Kit | | X |

The achromatic lens 66 can be attached to the lens adapter 12 or alternatively connected to the video camera 14 directly. The achromatic lens 66 comes in standard definition ("SD") (55 mm) and a high definition ("HD") (72 mm) version. In either case, the back part of the achromatic lens 66 has 72 mm screw threads that will fit into the video camera's lens filter screw mount (not shown). Some video cameras 14 (e.g., the Panasonic HVX200 and the HVX HD100YU) may use an 82 mm lens filter size and will require an 82 mm to 72 mm step-down adapter ring (not shown). Some video cameras 14 require that a spacer tube (e.g., 1, 2, 3, 4, 5 inch and fractional increments thereof) (not shown) be placed between the camera lens 72 and the achromatic lens 66. This allows numerous combinations and configurations that are included in the present invention.

The camera lens hood (not shown) and lens filters (not shown) are generally removed as it will change the distance between the achromatic lens 66 and the camera lens (not shown). An optional adapter ring (not shown) or spacer tube (not shown) may be added if necessary. The achromatic lens 66 may be attached to the lens adapter by screwing it into the camera lens mount (or the adapter ring or the spacer tube).

The video camera 14 and the lens adapter 10 may be attached to one or more support rods 54 and/or a rod support system. The lens adapter 10 may be moved until the flexible hood (not shown) on the back of the housing touches the front lip of the achromatic lens 66. The center of the camera lens (not shown) may be aligned with the center of the second coupling adaptor 44. Shims may be used to position the video camera 14 and the second coupling adaptor 44. The rod support system and support rods 54 of the present invention provide horizontal adjustments. The support rods 54 allow similar spacing on either side of the achromatic lens 66 from the edges of the lens adapter. A support plate 52 provides industry standard holes and allows the connection of a camera mounting plate 48 to the video camera 14 and a tripod (not shown) using thumbscrews (not shown).

The video camera 14 must be focused on the screen disc 32 and is referred to as the back focus. After the back focus is set, the camera lens 20 can be used to focus on the scene. For example, the back focus may be set by removing the camera lens 20, if it is attached to the lens adapter 12, and focusing the video camera 14 and lens adapter 12 at a moderately lit, light colored target. Fine horizontal alignment is carried out by slowly zoom in on the target, the shadowy areas in the upper corners will disappear off screen. These shadows should disappear at the same rate. If one of them disappears off screen faster, the video camera 14 is not perfectly aligned with the lens adapter 12 and the horizontal alignment must be adjusted. Using an external monitor (not shown) or focus assist (e.g., magnification) with peaking enabled, the camera lens 20 may be focused on the screen disc grain. During use, focus is accomplished with the camera lens 20 (front focus) once the back focus has been set. With the back focus set, a camera lens 20 can be attached to the first coupling adaptor 38 on the front of the lens adapter 12.

The lens adapter 12 of the present invention provides an image that is upside down with respect to the video camera 14; however, this is a common occurrence with film cameras as the image is upside down when it reaches the film. Although the footage will be upside-down when it is edited, this is a trivial issue as most popular non-linear editing system provides a method for image inversion. In addition, the present invention may include a device that optically turns the image right-side up, e.g., prisms or magnet. Alternatively, the present invention may include a separate monitor that either has an "invert" button or that can be mounted invertedly. For example, a LCD or plasma monitor may be used to view and to focus the camera lens 20.

The present invention includes a lens adapter 12 having a number of lens mounts that can use a variety of lenses, including professional film camera lenses. The lens mount assembly on the housing 16 of the present invention includes a lens mount 34, which connects a camera lens 20 to a flange. The flange (e.g., a tube of metal, plastic, polymer, composite, fiber, etc.) connects the housing 16 and provides a seat for the lens mount 34 and provides the proper distance between the back of the camera lens 20 and the screen disc 32, called the flange focal length ("FFL"). Some lens mounts 34 share the same flange and only the lens mount itself must be replaced. The Nikon, Canon FD, Olympus and Minolta lens mounts share the same flange. Some lens mounts require a different FFL or unique lens mounting mechanism and require replacing the lens mount and the flange, e.g., PL, OCT-19, Canon EOS and Pentax.

The general specification necessary include a 72 mm filter screw mount on the front of the video camera 14. Alternative, the filter screw mount on the front of the video camera 14 may use a step-up/step-down ring (not shown) to provide the desired size. The present invention includes a 72 mm achromatic that screws to the front of a camera's lens. The present invention includes an adapter that rests on rods (e.g., between about 5 and 25 mm including the industry-standard 15 mm support rods) and attaches to the achromatic via a rubber gasket.

In one embodiment the lens adapter 12 includes a clean out adapter (not shown) attached to the housing 14 and in optical communication with a reducer conduit (not shown) for fitting of a camera lens (not shown). The housing 14 also includes a second clean out adaptor (not shown) and an achromatic lens (not shown) in optical communication with a video camera (not shown).

The individual components of the present invention may be constructed out of metals, alloys, plastics, composite, fibers, resins, or combinations thereof. The screen disc 32 may also be constructed from a variety of materials like ground glass, a polymer, a plastic, a glass or combinations thereof. In addition, the screen disc 32 may be etched or coated with material and integrate filters therein. The power source may be an internal source like a battery or a direst connection to an external power source. Specific examples of lenses include a double convex 50 mm lens with a 250 mm focal length.

Support rods 54a and 54b may individually be of differing diameters (e.g., between about 5 and 30 mm including the industry standard about 15 mm), differing lengths (e.g., about 12 to 24 inches including the industry standard of about 18 inches), differing shape (e.g., a circular profile, square profile, polygonal profile, oval profile, and so forth) and differing composition (e.g., metals, alloys, plastics, composites, fiberglass, carbonfiber, polymers etc.). In addition, the support rods 54a and 54b may be coated with a material for specific applications, e.g., nonstick coating, non-slip coating, non-reflective coating and so forth.

It is contemplated that any embodiment discussed in this specification can be implemented with respect to any method, kit or device of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A multi-function imaging element for enhancing a projected image provided to an image capture or display device having a second image size and a second optical depth of field, the multi-function imaging element comprising a focusing screen that minimizes light hot spots in the projected image having a first image size and a first optical depth of field on the focusing screen and filters ultraviolet rays, wherein the first image size is larger than the second image size, the first optical depth of field is less than the second optical depth of field.

2. The multi-function imaging element as recited in claim 1, wherein:
the focusing screen comprises a diffusion screen made of glass, ground glass, acrylic, crystalline wax or plastic that has been treated by sandblasting, laser etching or acid washing;
the focusing screen is static, moves, oscillates or rotates; and
the ultraviolet rays are filtered using a coating on the focusing screen, or by a separate filter made of glass, plastic or film.

3. The multi-function imaging element as recited in claim 1, wherein the multi-function imaging element is integrated into an adapter, a camera, a video camera, a projector, a television or a monitor.

4. A method for providing an enhanced image to an image capture or display device having a second image size and a second optical depth of field, the method comprising the steps of:
filtering light to reduce ultraviolet rays;
diffusing the filtered light to minimize light hot spots; and
projecting the diffused light on an image reception area to create the enhanced image having a first image size that is larger than the second image size and a first optical depth of field that is less than the second optical depth of field.

5. The method as recited in claim 4, further comprising the step of reducing a focal length of the image capture or display device so that the enhanced image on the image reception area is in focus.

6. The method as recited in claim 5, wherein the focal length of the image capture or display device is reduced using an achromatic lens.

7. The method as recited in claim 4, wherein the steps of filtering the received light, diffusing the filtered light and projecting the diffused light are performed using a single multifunction element.

8. The method as recited in claim 7, wherein the single multifunction element comprises a static, moving, oscillating or rotating focusing screen.

9. The method as recited in claim 4, further comprising the step of inverting the enhanced image.

10. An adapter for providing an enhanced image to an image capture or display device having a second image size and a second optical depth of field, the adapter comprising:
a housing having a first aperture positioned in optical communication and linear alignment with a second aperture;
a focusing screen disposed within the housing between the first aperture and the second aperture, wherein an image projected on the focusing screen has a first image size and a first optical depth of field, the first image size is larger than the second image size, and the first optical depth of field is less than the second optical depth of field;
a lens mount connected to the housing and fitted around the first aperture;
a hood connected to the housing and fitted around the second aperture; and
an achromatic lens connected to the hood in optical communication and linear alignment with the second aperture.

11. The adapter as recited in claim 10, wherein:
the focusing screen filters ultraviolet rays or the ultraviolet rays are filtered using a separate filter disposed between the lens mount and the achromatic lens; and
the focusing screen is static, moves, oscillates or rotates, and minimizes light hot spots in an image projected on the focusing screen.

12. The adapter as recited in claim 10, further comprising a motor disposed in the housing and connected operably to the focusing screen to move, oscillate or rotate the focusing screen.

13. The adapter as recited in claim 10, further comprising a diffusion filter disposed between the lens mount and the focusing screen.

14. The adapter as recited in claim 10, wherein:
the focusing screen comprises a diffusion screen made of glass, ground glass, acrylic, crystalline wax or plastic that has been treated by sandblasting, laser etching or acid washing; and
ultraviolet rays are filtered using a coating on the focusing screen, or by a separate filter made of glass, plastic or film.

15. The adapter as recited in claim 10, further comprising an external power source, an internal power source or a combination thereof electrically connected to the motor.

16. The adapter as recited in claim 10, further comprising a mount connected to the housing to stabilize an image capture or display device, a lens and the adapter.

17. An adapter kit for providing an enhanced image to an image capture or display device having a second image size and a second optical depth of field, the kit comprising:
a focusing screen, wherein an image projected on the focusing screen has a first image size and a first optical depth of field, the first image size is larger than the second image size, and the first optical depth of field is less than the second optical depth of field;
a housing having a first aperture positioned in optical communication and linear alignment with a second aperture to enclose the focusing screen between the first aperture and the second aperture;
a lens mount suitable for connecting to the housing and fitting around the first aperture;
a hood suitable for connecting to the housing and fitting around the second aperture; and
an achromatic lens suitable for connecting to the hood in optical communication and linear alignment with the second aperture.

18. The kit as recited in claim 17, further comprising a diffusion filter suitable for being positioned between the lens mount and the focusing screen.

19. The kit as recited in claim 17, wherein:
the focusing screen comprises a diffusion screen made of glass, ground glass, acrylic, crystalline wax or plastic that has been treated by sandblasting, laser etching or acid washing;
the focusing screen is static, moves, oscillates or rotates and minimizes light hot spots in the image projected on the focusing screen and
the ultraviolet rays are filtered using a coating on the focusing screen, or by a separate filter made of glass, plastic or film.

20. The kit as recited in claim 17, further comprising a motor suitable for mounting in the housing to move, oscillate or rotate the focusing screen.

21. The kit as recited in claim 20, further comprising an external power source, an internal power source or a combination thereof to power the motor.

22. The kit as recited in claim 17, further comprising a mount to connect and stabilize the housing, the image capture or display device and a lens.

23. A system comprising:
an image capture or display device having a second image size and a second optical depth of field;
a lens; and
a focusing screen disposed between the image capture or display device and the lens that minimizes light hot spots in an image having a first image size and a first optical depth of field projected on the focusing screen and filters ultraviolet rays, wherein the first image size is larger than the second image size, the first optical depth of field is less than the second optical depth of field.

24. The system as recited in claim 23, wherein the image capture or display device comprises a camera, a video camera, a projector, a television or a monitor.

25. The system as recited in claim 23, wherein the focusing screen is disposed within an adapter and a mount is connected to the image capture or display device, the lens and the adapter to stabilize the system.

26. The system as recited in claim 25, wherein the adapter comprises:
a housing having a first aperture positioned in optical communication and linear alignment with a second aperture;
the focusing screen is disposed within the housing between the first aperture and the second aperture;
a lens mount connected to the housing and fitted around the first aperture;
a hood connected to the housing and fitted around the second aperture; and
an achromatic lens connected to the hood in optical communication and linear alignment with the second aperture.

27. The system as recited in claim 23, wherein:
the focusing screen comprises a diffusion screen made of glass, ground glass, acrylic, crystalline wax or plastic that has been treated by sandblasting, laser etching or acid washing; and
the ultraviolet rays are filtered using a coating on the focusing screen, or by a separate filter made of glass, plastic or film.

* * * * *